(12) United States Patent
Aeberhard

(10) Patent No.: US 7,455,123 B2
(45) Date of Patent: Nov. 25, 2008

(54) HAND-HELD POWER TOOL WITH A TORQUE-LIMITING UNIT

(75) Inventor: Bruno Aeberhard, Studen (CH)

(73) Assignee: Robert Bosch GmbH, Stuttgart (DE)

( * ) Notice: Subject to any disclaimer, the term of this patent is extended or adjusted under 35 U.S.C. 154(b) by 328 days.

(21) Appl. No.: 11/291,832

(22) Filed: Dec. 1, 2005

(65) Prior Publication Data

US 2006/0118380 A1    Jun. 8, 2006

(30) Foreign Application Priority Data

Dec. 7, 2004 (DE) .................. 10 2004 058 807

(51) Int. Cl.
   B25B 23/14    (2006.01)
   F16D 43/20    (2006.01)
   B23Q 5/00     (2006.01)

(52) U.S. Cl. .................. 173/178; 173/176; 192/56.61; 464/38

(58) Field of Classification Search .................. 81/467; 464/38

See application file for complete search history.

(56) References Cited

U.S. PATENT DOCUMENTS

| 3,942,337 | A | 3/1976 | Leonard et al. |
| 6,502,648 | B2 * | 1/2003 | Milbourne .................. 173/178 |
| 6,739,225 | B2 | 5/2004 | Bader et al. |
| 6,832,533 | B1 * | 12/2004 | Huang .................. 81/467 |
| 7,360,607 | B2 * | 4/2008 | Aeberhard .................. 173/176 |

FOREIGN PATENT DOCUMENTS

DE         103 09 057       9/2004

* cited by examiner

Primary Examiner—Rodney H Bonck
(74) Attorney, Agent, or Firm—Michael J. Striker

(57) ABSTRACT

A hand-held power tool has a motor output shaft, a tool driver, and a torque-limiting unit with which a maximum torque transferred from the motor output shaft to the tool driver is adjustable by an operator, the torque-limiting unit including a spring system, the spring system including differently-acting spring elements.

17 Claims, 3 Drawing Sheets

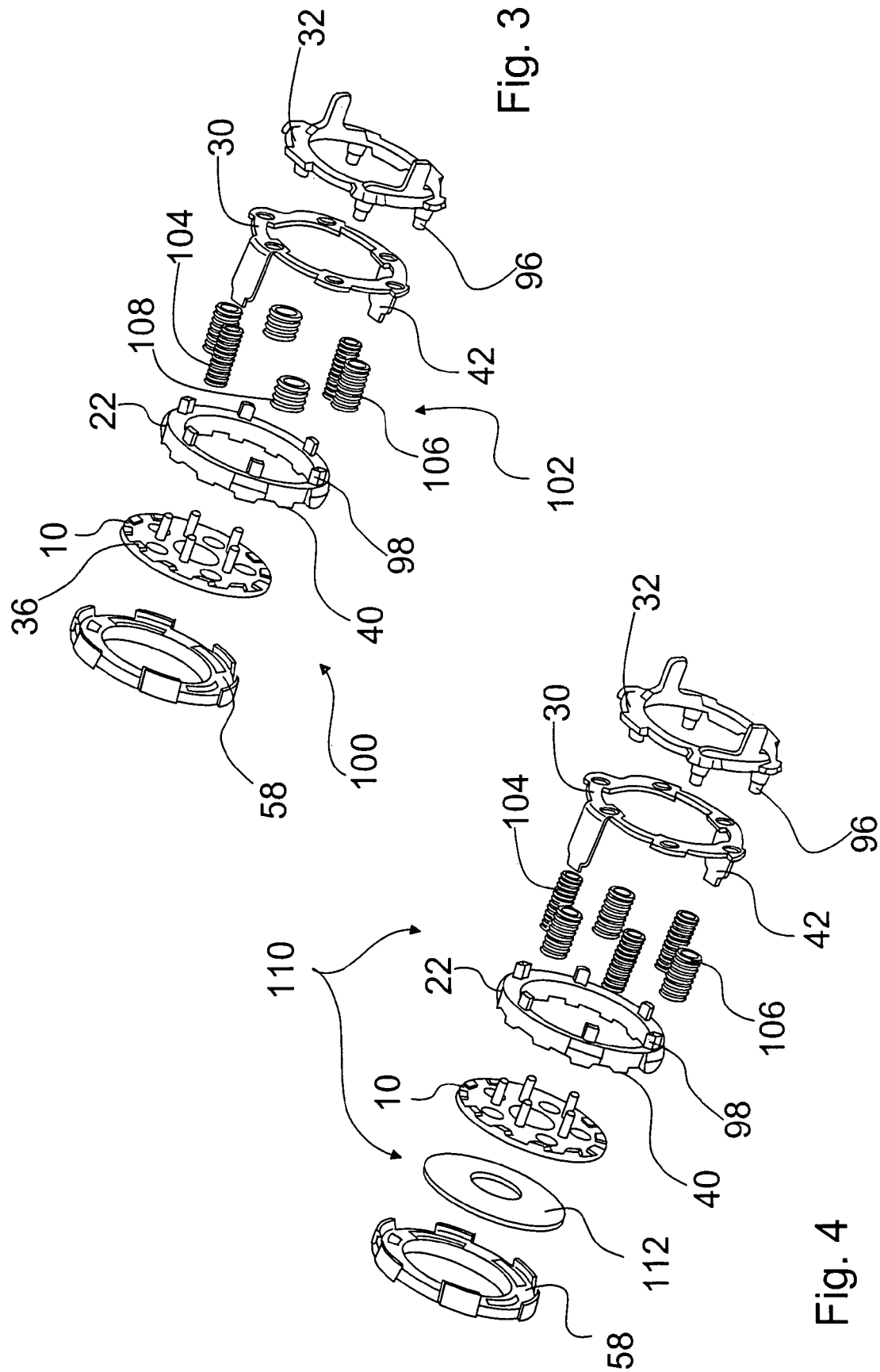

HAND-HELD POWER TOOL WITH A TORQUE-LIMITING UNIT

BACKGROUND OF THE INVENTION

The present invention is directed to a hand-held power tool with a torque-limiting unit.

Hand-held power tools, such as cordless screwdrivers, cordless drills or cordless impact drills have a high amount of drive torque. Limiting this torque is desirable for many applications. Adjustable torque limitation makes it possible, e.g., to screw a number of screws into a work piece with the same level of screw-down torque; a torque-limiting unit disengages as soon as the screws apply a certain level of torque resistance to the motor output shaft. The operator can adjust the torque-limiting unit according to the maximum torque required for the task at hand. A hand-held power tool with torque limitation of the type described above is made known in DE 103 09 057 A1.

SUMMARY OF THE INVENTION

Accordingly, it is an object of the present invention to provide a hand-held power tool with a torque-limiting unit, which is a further improvement of the existing hand-held power tools.

The present invention is directed to a hand-held power tool with a torque-limiting unit with which a maximum torque transferred from a motor output shaft to a tool driver is adjustable by an operator, the torque-limiting unit including a spring system.

It is provided that the spring system includes differently-acting spring elements. A non-linear spring characteristic curve of the spring system can be obtained using simple spring elements. As a result, a maximum torque can be easily set in a range of small torques very precisely and over a broad torque range. Typically, an adjustable maximum torque is between 1 Nm and 15 Nm, e.g., to quickly drive screws into wood without damaging the screws or the wood.

A particularly comfortable adjustment of the maximum torque can be obtained when the maximum torque can be set very precisely in a range of small torques, e.g., up to 5 Nm. To this end, the spring system can have a spring characteristic curve in this range that is flatter than it is in the range of greater torques, in which the maximum torque can be adjusted less precisely. In addition, the adjustment characteristics of the torque-limiting unit can be easily adapted to different hand-held power tools and/or series of hand-held power tools by using differently-acting spring elements in the spring system.

A different action of the spring elements can be achieved when the spring elements are located such that they are staggered in terms of their direction of motion. When the spring system is actuated, for example, only a few spring elements are actuated at first, followed by all spring elements. A particularly simple assembly and compact design of the hand-held power tool can be achieved when the spring elements have different elasticities. A different spring action can be achieved by using different spring characteristic curves, i.e., using different spring rates or levels of stiffness, e.g., by using thicker and thinner springs. A different spring action can also be obtained by using different maximum spring forces of the spring elements.

The spring elements can be configured with a particularly long service life and compact in design as compression springs, e.g., as disk springs or coiled springs. A combination of at least one disk spring and a coiled spring is also feasible. In this case, the disk spring is advantageously the stronger-acting spring element, and the coiled spring is the weaker-acting spring element.

A torque-limiting unit that can be adjusted particularly precisely in a small torque range and over a broad torque range can be obtained when the spring elements are of different lengths. Advantageously, the spring elements also differ in terms of their stiffness. The system of at least a first spring element and a second spring element that is shorter and stiffer than the first spring element is particularly compact.

A highly variable, compact and mechanically stable spring system can be obtained when the spring system includes six spring elements. These six spring elements are advantageously positioned in a hexagonal pattern.

A progressive spring system with two-stage spring stiffness and high mechanical stability can be obtained when the spring system includes three groups of different spring elements. Progressivity can be obtained via the different spring elements, and mechanical stability can be obtained by the groups of spring elements. Advantageously, the spring elements differ in terms of length and thickness.

It is also provided that the spring system includes a spring element of an overload clutch that interrupts a flux of force between the motor output shaft and the tool driver when the transferred torque exceeds a preset overload torque. This enables a combination of overload clutch and torque-limiting unit to have a very compact design.

The overload torque can be defined by the stiffness of the spring element. To this end, the spring element of the overload clutch is advantageously the strongest spring element in the spring system, i.e., it is the spring element with the greatest stiffness. An overload torque can be attained that is far above a progressively adjustable, greatest maximum torque.

In a further embodiment of the present invention, the hand-held power tool includes an adjusting element with which the maximum torque can be adjusted that has a radial cam with a uniformly increasing curved path. Due to the uniformly increasing curved path, the adjusting element can be blocked in a particularly simple and reliable manner, e.g., it can snap into place, to prevent unintended displacement of the adjusting element during operation of the hand-held power tool.

Advantageously, the radial cam includes a first segment for adjusting the maximum torque and a second segment with a control effect that is different from that of the first segment, for adjusting a drilling mode without adjustable torque limitation. The second segment of the radial cam can be designed, e.g., steeper than the first segment, so that, when the adjusting element is actuated briefly, a big change in the maximum torque to a bridging-over setting and/or an overload torque can be attained. It is also possible to design the second segment to be very flat and/or without a change in torque, which can prevent the adjusting element from being unintentionally pressed out of the setting for the drilling mode.

The novel features which are considered as characteristic for the present invention are set forth in particular in the appended claims the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
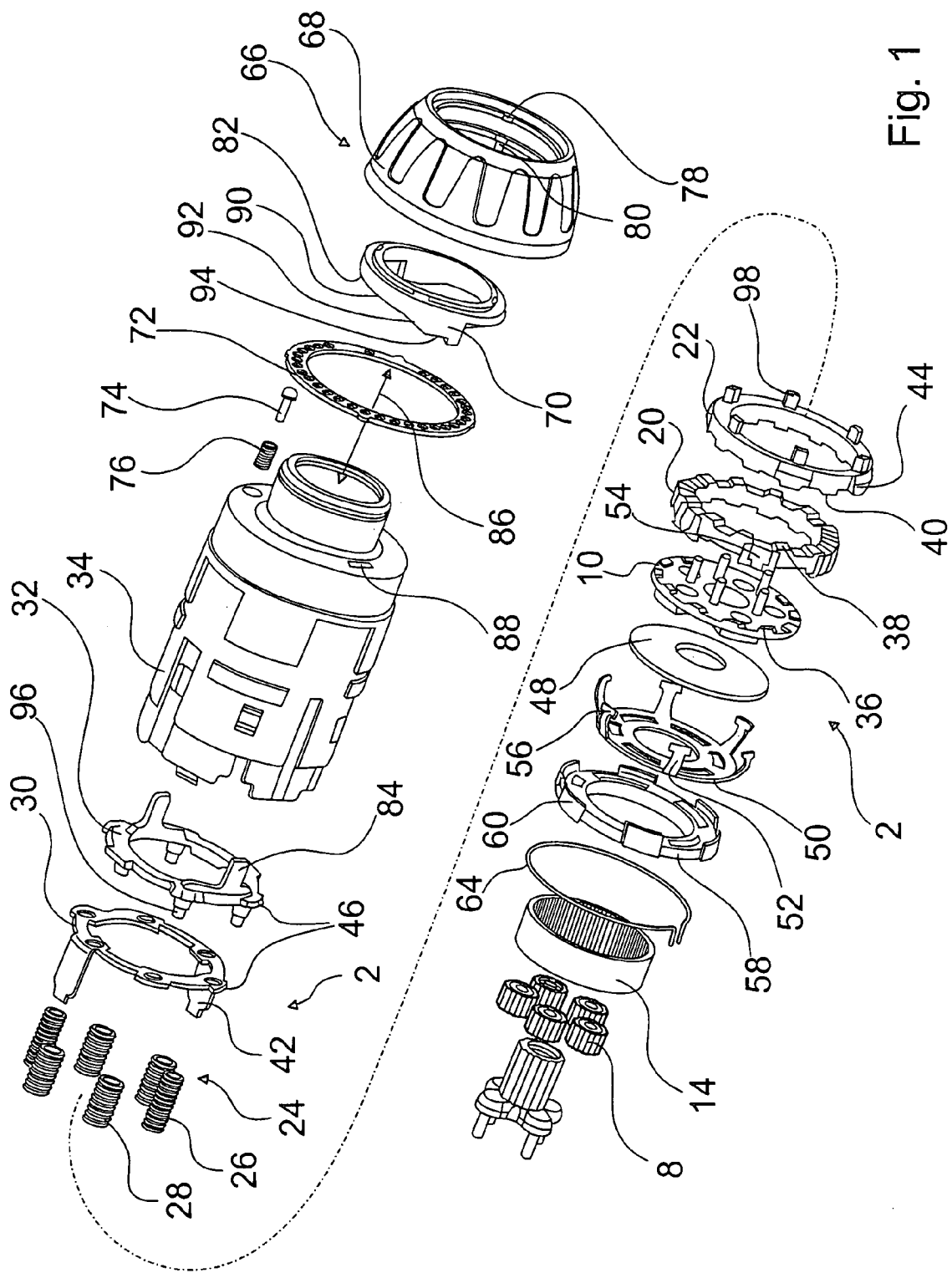
FIG. 1 Shows a front part of a cordless screwdriver with a torque-limiting unit and an overload clutch, in an exploded view, FIG. 2 Shows the front part of FIG. 1 in a sectional view, FIG. 3 Shows elements of a further torque-limiting unit with an alternative spring system, and FIG. 4 Shows a further spring system of a torque-limiting unit.
Figure 2:
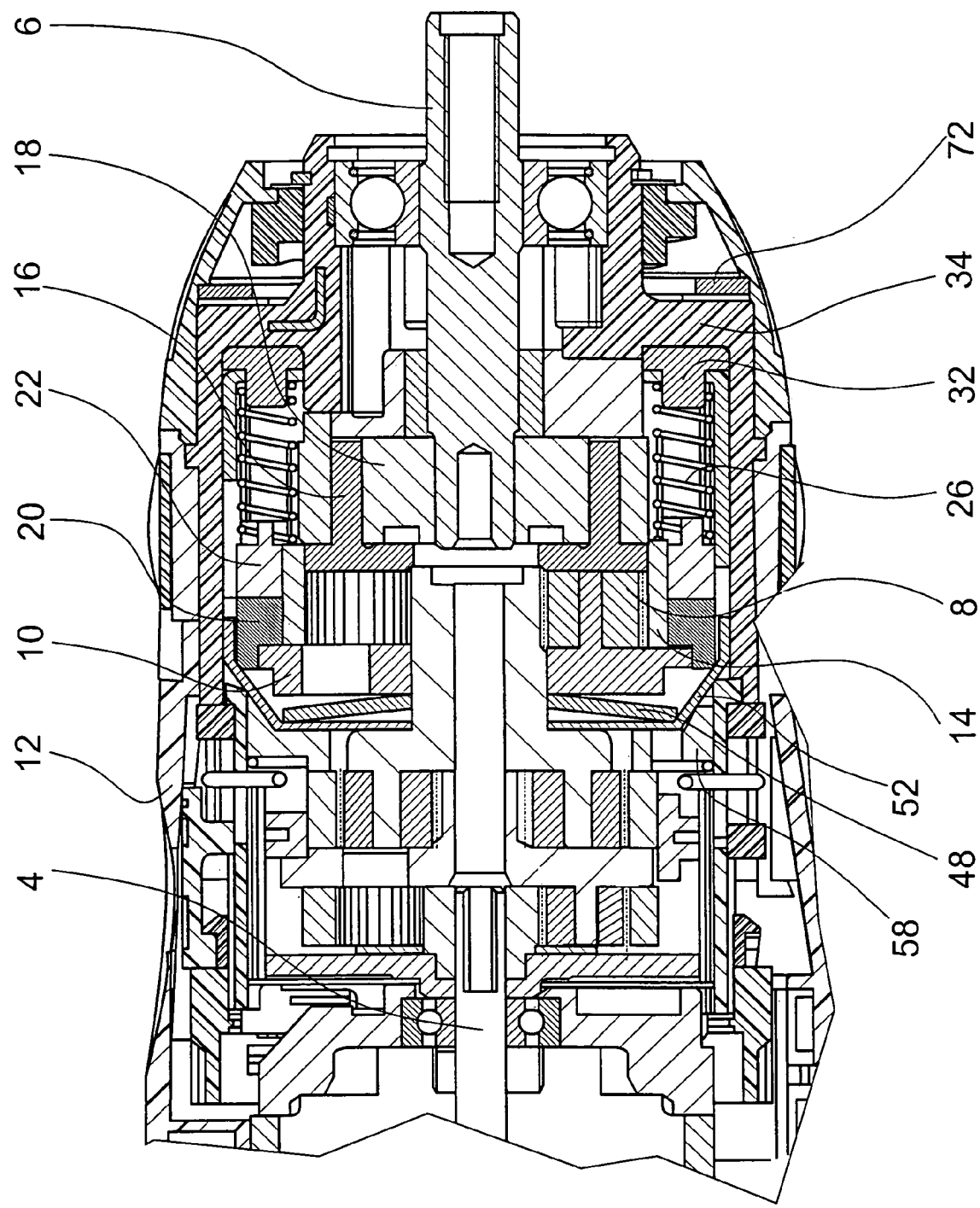

FIGS. 1 and 2 show a front part of a hand-held power tool designed as a cordless screwdriver, in an exploded view (FIG. 1) and a sectional illustration (FIG. 2).

The hand-held power tool includes a torque-limiting unit 2, a motor output shaft 4, and a tool driver 6. To drive tool driver 6, torque from motor output shaft 4 is transferred to three-stage planetary gearing that includes planet gears 8 that therefore rotate on their axes. Planet gears 8 are supported on a planet carrier 10 that, in the normal working mode, is fixedly connected with a housing 12 of the hand-held power tool. Planet gears 8 drive an internal gear 14, the inner toothing of which encompasses a driving element 16 and drives it. Driving element 16 drives a star wheel 18, and star wheel 16 drives tool driver 6 via a square socket.

In normal operation, planet carrier 10 is non-rotatably connected with a guide sleeve 34 via two locking discs 22, 20, a spring system 24 composed of six spring elements 26, 28 and two thrust members 30, 32, with guide sleeve 34, in turn, being non-rotatably fastened to housing 12 of the hand-held power tool. The non-rotatable connection is created by cams 36 on planet carrier 10 that engage with cams on first locking disc 20, first locking disc 20 with cams 38 being connected with second locking disc 22 via cams 40 on second locking disc 22. Second locking disc 22 is retained by arms 42 of thrust member 30, arms 42 extending between raised areas 44 of second locking disc 22. Both thrust members 30, 32 are retained via projections 46 in the inner grooves of guide sleeve 34.

A disk spring 48 is located behind planet carrier 10 on the transmission side, disk spring 48 being inserted in a holder 50. Holder 50 encompasses disk spring 48 and planet carrier 10 via arms 52, and engages in recesses 54 of first locking disc 20. Arms 52 are held in recesses 54 via wide sections 56, holder 50 being held—via a tension with which disk spring 48 is compressed slightly—against locking disk 20 and clamps planet carrier 10 between disk spring 48 and locking disk 20. A retaining wheel 58 is located behind holder 50; it engages via recesses 60 in inner grooves of guide sleeve 34 and is therefore non-rotatably connected with guide sleeve 34 and a wire ring 64 in guide sleeve 34.

To adjust a maximum torque to be transferred to tool driver 6, the spring pressure of spring system 24 applied to second locking disc 20 can be varied with the aid of adjusting element 66. To this end, adjusting element 66 includes an actuating element 68, a cam ring 70, a locking disk 72, a bolt 74, and a spring 76. A recess 78 and a groove 80 non-rotatably hold cam ring 70 and/or locking disk 72 in actuating element 68. When actuating element 68 is rotated, cam ring 70 also rotates, arms 84 sliding on a cam track 82 of cam ring 70, which causes second thrust member 32 to move in axial direction 86.

Arms 84 extend through recesses 88 in guide sleeve 34 and, loaded by the spring force of coiled springs 24, are pressed against cam track 82. When second thrust member 32 moves in axial direction 86, the spring pressure of spring system 24 with which second locking disc 22 is pressed against first locking disk 20 varies. Locking disk 72, via its holes in which bolt 74 engages, prevents unintentional displacement of actuating element 68 during operation of the hand-held power tool.

Spring system 24 includes six spring elements 26, 28 situated in a spring assembly, spring elements 26, 28 being designed as compression springs in the form of coiled springs. Spring elements 26, 28 are positioned in a hexagonal pattern and include two groups: The four shorter and stiffer—i.e., having stronger spring action—spring elements 28 and the two longer spring elements 26 with weaker spring action. As a result of this stable arrangement, a single-staged progression of the maximum torque can be attained with uniform displacement of cam ring 70.

When the smallest possible maximum torque of 1 Nm is set via cam ring 70, the longer spring elements 26 are held between locking disk 22 and thrust member 30 with slight preload. When cam ring 70 is rotated toward a larger maximum torque, spring elements 26 are initially compressed, whereas shorter spring elements 28 are still located between locking disk 22 and thrust member 30 with a slight amount of play. Starting at a maximum torque of 4 Nm, when cam ring 70 is rotated further, the four spring elements 28 are also compressed, so that the maximum torque now increases more rapidly when cam ring 70 is rotated in a uniform manner, and in fact, up to a value of 15 Nm.

During normal operation of the hand-held power tool, in which a torque applied to tool driver 6 is below the set maximum torque, planet carrier 10 is stationary relative to housing 12. If the torque applied to tool driver 6 reaches the maximum torque level that was set, second locking disc 22 is deflected against spring system 24 by beveled flanks of cams 38, 40, and first locking disc 20 can rotate against second locking disc 22 along with planet carrier 10. Internal gear 14 is stationary, and the transfer of torque from motor output shaft 4 to tool driver 6 is interrupted above the maximum torque.

To bridge torque-limiting unit 2, cam ring 70 includes—in addition to a uniformly increasing first segment 90 inside radial cam 82 to realize a drilling mode—a second, more steeply rising segment 92 and a third, flat segment 94 that brings about no change in the spring pressure of spring system 24 when cam ring 70 is rotated. The maximum torque of 1 Nm to 15 Nm is adjusted by moving arms 84 over first segment 90.

When the bridging-over setting is set, arms 84 rest on third segment 94 and are deflected away to a maximum extent in the direction of motor output shaft 4 of the hand-held power tool. Spring elements 26, 28 are compressed together so far that pins 96, 98 holding spring elements 26, 28 touch each other. As a result, locking disk 22 is retained between locking disk 20 and thrust member 32 in axial direction 86 such that it cannot be deflected. First locking disk 20 is now unable to slide over second locking disk 22. In addition, arms 42 extend between recesses 54 of locking disc 20, by way of which locking disk 20 is non-rotatably connected with guide sleeve 34.

In this position, a level of torque that could damage the hand-held power tool and that is dangerous to the operator could be transferred to tool driver 6 by torque-limiting unit 2. To prevent this much torque from being transferred, an overload clutch that interrupts the flux of force to tool driver 6 when an overload torque is exceeded is located on planet carrier 10. If a torque level is transferred to tool holder 6 that reaches the level of overload torque specified by the spring force of disk spring 48 in the drilling position, plant carrier 10 is deflected via beveled flanks of cams 36 and the cams on locking disk 20 in the direction toward disk spring 48, and disk spring 48 is compressed further against its preload. Planet carrier 10 can now rotate against locking disk 20, by way of which the flux of force from motor output shaft 4 to tool driver 6 between planet carrier 10 and locking disk 20 is interrupted.

An alternative arrangement of the elements of a torque-limiting unit 100 and an overload clutch is shown in FIG. 3. Components that are essentially the same are labelled with the same reference numerals. Refer to the description of the exemplary embodiment in FIGS. 1 through 2 for the features and functionalities that are the same.

Torque-limiting unit 100 includes a spring system 102 with three groups of two spring elements 104, 106, 108 having different lengths and stiffness, configured as coiled springs. As with spring system 24, a single-staged, progressive adjustment of spring force and/or maximum torque can be attained with spring elements 104, 106. The shortest spring elements 108 are situated with play between locking disk 20 and thrust member 30 and do not yet contribute to the force of spring system 102. When cam ring 70 is moved into the drilling setting, in which arms 84 rest on third segment 94, very short and very stiff spring elements 108 are also compressed, although a small amount of play remains between pins 96, 98.

The maximum torque is now set to 50 Nm by very stiff spring elements 108 that belong to the overload clutch. This is the overload torque.

When the torque transferred to tool driver 6 reaches the level of overload torque, locking disk 22 is deflected by the beveled flanks of cams 36, 40 in the direction toward thrust member 30, and cams 36, 40 disengage. The flux of force from motor output shaft 4 to tool driver 6 is therefore interrupted at the same point at which it is also interrupted by torque-limiting unit 100 at a maximum torque set outside of the drilling setting.

A further spring system 110 is shown in FIG. 4. Spring system 110 includes two groups with spring elements 104, 106, each group being arranged in triangles, in an alternating pattern, with an overall hexagonal arrangement. Spring system 110 also includes a disk spring 112 located in series relative to spring elements 104, 106. Disk spring 112 is an element of a torque-limiting unit.

When cam ring 70 is rotated from a smallest maximum torque toward a larger maximum torque, spring elements 104 are initially compressed, then spring elements 106 are compressed until pins 96, 98 touch each other at a maximum torque of 8 Nm. When cam ring 70 is rotated further, disk spring 112 is compressed further and, as a result, the pressure of spring system 110 is increased further, up to a greatest maximum torque of 20 Nm.

It is also feasible to assign disk spring 112 to an overload clutch that is compressed when arms 84 slide over second segment 92 toward third segment 94 and defines an overload torque. As a further alternative, spring system 110 includes three groups of spring elements, similar to spring system 102, but with fewer stiff spring elements.

Together with disk spring 112, a three-staged progression of spring force of spring system 110 and/or the maximum torque can be attained in this manner. A spring system with two or more disk springs situated in series and having different levels of stiffness is also feasible.

It will be understood that each of the elements described above, or two or more together, may also find a useful application in other types of constructions differing from the types described above.

While the invention has been illustrated and described as embodied in hand-held power tool with a torque-limiting unit, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A hand-held power tool, comprising a motor output shaft; a tool driver; a first and a second locking disc; a thrust member; and a torque-limiting unit with which a maximum torque transferred from said motor output shaft to said tool driver is adjustable by an operator, said torque-limiting unit including a spring system, said spring system including differently-acting spring elements generating different spring forces, wherein said spring system is held by said second locking disc and each spring element of the spring system is held between a pin of the second locking disc and a pin of said thrust member, wherein the first locking disc is connected with the second locking disc via cams, wherein said cams are built on each of said locking discs, wherein if a torque applied to the tool driver reaches a selected maximum torque level, the second locking disc is deflected against the spring system by beveled flanks of said cams, and the first locking disc can rotate against the second locking disc.

2. A hand-held power tool as defined in claim 1, wherein said spring elements of said spring system have different elasticities.

3. A hand-held power tool as defined in claim 1, wherein said spring elements of said spring system are compression springs.

4. A hand-held power tool as defined in claim 1, wherein said spring elements of said spring system have different lengths.

5. A hand-held power tool as defined in claim 1, wherein said spring system includes six said spring elements.

6. A hand-held power tool as defined in claim 1, wherein said spring system includes three groups of different ones of said spring elements.

7. A hand-held power tool as defined in claim 1, wherein one of said spring elements of said spring system is configured as a spring element of an overload clutch that interrupts a flux of force between said motor output shaft and said tool driver when a transferred torque exceeds a preset overload torque.

8. A hand-held power tool as defined in claim 7, wherein said spring element of said overload clutch is a strongest one of said spring elements in said spring system.

9. A hand-held power tool as defined in claim 1; and further comprising an adjusting element for adjusting the maximum torque transferrable from said motor output shaft to said tool driver, said adjusting element having a radial cam with a uniformly increasing curved path.

10. A hand-held power tool as defined in claim 9, wherein said radial cam includes a first segment for adjusting a maximum torque and a second segment with a control effect that is different from a control effect of said first segment, for adjusting a drilling mode without adjustable torque limitation.

11. A hand-held power tool as defined in claim 1, wherein each of said spring elements of said spring system is held by a pin of said second locking disc.

12. A hand-held power tool as defined in claim 11, wherein the pins of said second locking disc are spaced apart in a circumferential direction of said second locking disc.

13. A hand-held power tool as defined in claim 1, wherein each of said spring elements of said spring system is slipped on a pin of said second locking disc.

14. The hand-held power tool as recited in claim 1, wherein pins of the thrust member are spaced apart in a circumferential direction on the thrust member.

15. The hand-held power tool as recited in claim 1, wherein the second locking disc and the thrust member have a ring-like shape.

16. The hand-held power tool as recited in claim 1, wherein the first locking disc interacts with the second locking disc to form the torque-limiting unit.

17. The hand-held power tool as recited in claim 1, wherein the first locking disc interacts with a planet carrier to form an overload clutch.

\* \* \* \* \*